United States Patent
Kinjou et al.

(10) Patent No.: US 9,081,549 B2
(45) Date of Patent: Jul. 14, 2015

(54) SUPPORTING APPARATUS, SUPPORT MEMBER, AND ELECTRONIC DEVICE

(71) Applicant: KABUSHIKI KAISHA TOSHIBA, Minato-ku, Tokyo (JP)

(72) Inventors: Kazuyuki Kinjou, Kanagawa (JP); Ko Takahashi, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 38 days.

(21) Appl. No.: 13/970,156

(22) Filed: Aug. 19, 2013

(65) Prior Publication Data

US 2014/0118904 A1    May 1, 2014

(30) Foreign Application Priority Data

Oct. 31, 2012   (JP) .................. 2012-241089

(51) Int. Cl.
*H05K 7/20*    (2006.01)
*G06F 1/16*    (2006.01)

(52) U.S. Cl.
CPC ............ *G06F 1/1656* (2013.01); *G06F 1/1616* (2013.01)

(58) Field of Classification Search
None
See application file for complete search history.

(56) References Cited

U.S. PATENT DOCUMENTS

| 5,666,261 A * | 9/1997 | Aguilera .................. 361/679.09 |
| 6,149,727 A | 11/2000 | Yoshioka et al. |
| 7,130,005 B2 * | 10/2006 | Takata et al. .................... 349/58 |
| 2008/0232058 A1 * | 9/2008 | Horiuchi et al. .............. 361/683 |
| 2011/0310538 A1 | 12/2011 | Abe et al. |
| 2013/0044266 A1 | 2/2013 | Abe et al. |
| 2013/0321989 A1 * | 12/2013 | Uesugi et al. ............ 361/679.01 |

FOREIGN PATENT DOCUMENTS

| JP | 04-79036 U | 7/1992 |
| JP | 11-104541 A | 4/1999 |
| JP | 2012-004977 A | 1/2012 |

* cited by examiner

*Primary Examiner* — Anthony Q Edwards
(74) *Attorney, Agent, or Firm* — Knobbe, Martens, Olson & Bear LLP

(57) ABSTRACT

According to one embodiment, a supporting apparatus includes a supporting portion and a suction module. The supporting portion is configured to support a wall of an electronic device. The electronic device includes a first surface with a honeycomb rib protrusion. The supporting portion includes a second surface including a first groove and an inlet. The first groove is configured to receive the rib in a state in which the supporting portion supports the wall. The inlet is configured to open toward a first face at a position within a hexagonal ring-like part of the first groove. The suction module is configured to take in air through the inlet.

8 Claims, 8 Drawing Sheets

SUPPORTING APPARATUS, SUPPORT MEMBER, AND ELECTRONIC DEVICE

CROSS-REFERENCE TO RELATED APPLICATIONS

This application is based upon and claims the benefit of priority from Japanese Patent Application No. 2012-241089, filed Oct. 31, 2012, the entire contents of which are incorporated herein by reference.

FIELD

Embodiments described herein relate generally to a supporting apparatus, a support member, and an electronic device.

BACKGROUND

Conventionally, there is known an electronic device comprising a housing. Here, an inner surface of a wall of the housing is provided with a honeycomb rib.

When such wall of the electronic device is processed during the manufacturing process, sometimes it is preferable for the wall to be enabled to be supported less inconveniently.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
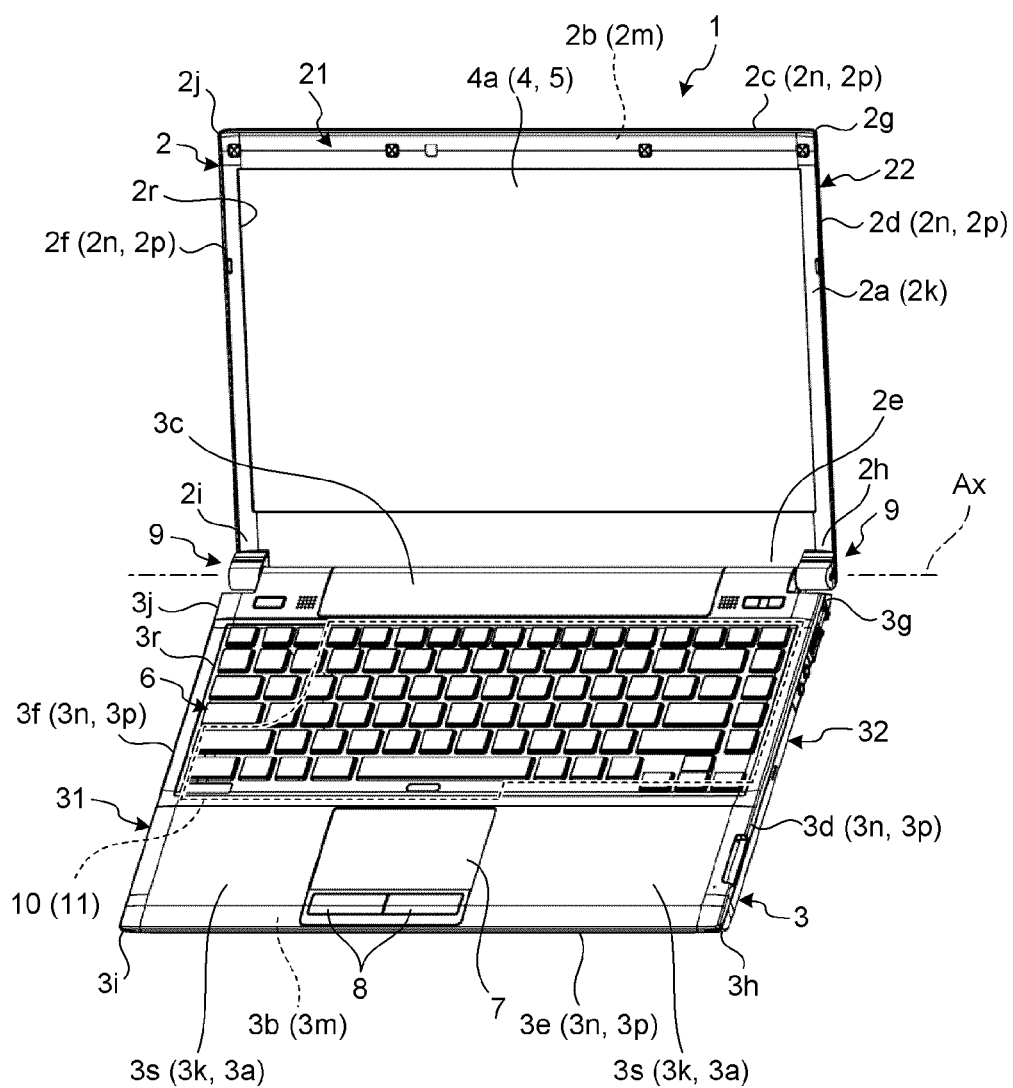
FIG. 1 is an exemplary perspective view of one example of an electronic device according to an embodiment.

In general, according to one embodiment, a supporting apparatus comprises a supporting portion and a suction module. The supporting portion is configured to support a wall of an electronic device. The electronic device includes a first surface with a honeycomb rib. The supporting portion includes a second surface including a first groove and an inlet. The first groove is configured to receive the rib in a state in which the supporting portion supports the wall. The inlet is configured to open toward a first face at a position within a hexagonal ring-like part of the first groove. The suction module is configured to take in air through the inlet.

The following exemplary embodiment and modifications comprise the same elements. Therefore, in the explanations below, the same reference numerals are assigned to the same elements, and redundant explanations thereof are omitted. A part comprised in the embodiment or the modifications may be replaced with a corresponding part in the other embodiment or modifications.

Furthermore, in the following embodiment, there is exemplified an electronic device that is configured as a clam-shell (laptop, foldable) personal computer. However, the electronic device according to the embodiment is not limited thereto. The electronic device according to the embodiment may be various electronic devices such as a tablet personal computer, a smartphone, an electronic book terminal, a smartbook, a cellular phone, a personal digital assistant (PDA), a video display device, a television receiver, a video phone, a video display controller, or an information storage device, to which a honeycomb rib is provided to an inner surface of a wall of a housing thereof.

In an embodiment, as an example, as illustrated in FIG. 1, an electronic device 1 comprises a housing 2 (a first housing, a housing, a first part) and a housing 3 (a second housing, another housing, a second part). In the housing 2, at least a portion of a display device 4 is housed. In the housing 3, a board 10 is housed. The housing 3 is provided with a keyboard 6 (an input operation module, an input receiver, an input module), a touch pad 7 (an input operation module, an input receiver, an input module), click buttons 8 (input operation modules, input receiver, input modules), and the like.

The housing 2 and the housing 3 are rotatably connected by hinges 9 (connecting portions, linking portions, rotatable supports, hinge mechanisms, connecting mechanisms, linking mechanisms, rotatably supporting mechanisms). The housing 2 and the housing 3 are rotatably connected by the hinges 9 at least between an opened position illustrated in FIG. 1 and a folded position not illustrated. In the embodiment, as an example, the hinges 9 rotatably connect the housing 2 and the housing 3 about a rotation axis Ax. A display screen 4a of the display device 4 can be viewed through an opening 2r provided to a surface 2a (a front surface, a surface, a surface portion) of the housing 2. The keyboard 6, the touch pad 7, the click buttons 8, and the like are exposed from a surface 3a (a top surface, a front surface, a first surface, a first surface portion) of the housing 3. In the folded position, the surface 3a of the housing 3 and the surface 2a of the housing 2 meet each other, and the display screen 4a, the keyboard 6, the touch pad 7, the click buttons 8, and the like are hidden by the housing 3 and the housing 2. In the opened position, the surface 3a of the housing 3 and the surface 2a of the housing 2 become exposed, and the display screen 4a, the keyboard 6, the touch pad 7, the click buttons 8, and the like are made available for use (become viewable or operable).

In the embodiment, as an example, the housing 2 has an appearance of a rectangle (in the embodiment, an oblong that is long in lateral directions, as an example) in the front view and the rear view, as illustrated in FIG. 1. In the embodiment, the housing 2 has a rectangular parallelepiped shape that is thin and flat in the front-back direction (the thickness direction of the housing 2), as an example. The housing 2 has the surface 2a (the front surface, the frontal surface, the surface portion), a surface 2b (a rear surface, a back surface, a surface portion) that is opposite the surface 2a, and a surface 2p (a side surface, a surface portion) extending between the surface 2a and the surface 2b. The surface 2a and the surface 2b both intersect with the thickness direction. The surface 2a and the surface 2b extend approximately in parallel. The surfaces 2a, 2b intersect (in the embodiment, perpendicularly, as an example) with the surface 2p. The housing 2 also has four ends 2c to 2f (side portions, edge portions, peripheral portions) and four corners 2g to 2j (pointed portions, curved portions, ends) in the front view. The ends 2c and 2e are examples of a longer side. The ends 2d and 2f are examples of a shorter side.

The housing 2 also has a wall 2k (a part, a plate, a front wall, a frontal wall, a top wall, a first wall), a wall 2m (a part, a plate, a rear wall, a back wall, a bottom wall, a second wall), and a wall 2n (a part, a plate, a side wall, a edge wall, a standing wall, a stretching portion, a third wall). The wall 2k comprises the surface 2a. The wall 2m comprises the surface 2b. The wall 2n comprises the surface 2p. The walls 2k, 2m, and 2n all have a rectangular shape (in the embodiment, an oblong shape, as an example). The walls 2k, 2m, 2n also all have a plate-like shape. The wall 2k has the rectangular opening 2r.

The housing 2 is configured as a combination of a plurality of components (divided portions, members). The housing 2 comprises a member 21 (a front side member, a cover, a bezel, a plate, a first member) and a member 22 (a rear side member, a base, a bottom, plate, a second member), as an example. The member 21 comprises the wall 2k. The member 22 comprises the wall 2m. The wall 2n is comprised at least one of the member 21 and the member 22 (in the embodiment, in the member 22, as an example). The members 21, 22 may be made of a material such as a metal or a synthetic resin. When a metallic material is used, these members maybe produced by casting, pressing, or machining, for example. When a synthetic resin material is used, these members may be produced by injection molding, for example. The housing 2 may comprise another member (not illustrated) in addition to the members 21, 22.

In the embodiment, as an example, the display device 4 (the display module, the display, panel, the display component) is housed in the housing 2. Specifically, a user can view the display screen 4a of the display device 4 from the front side through an opening 3r. The display device 4 has an appearance of a rectangle (an oblong, in the embodiment, as an example) in the front view. The display device 4 has a rectangular parallelepiped shape that is thin and flat in the front-back direction. The display device 4 is a liquid crystal display (LCD) or an organic electro-luminescent display (GELD), for example. The display device 4 may also be a flexible display.

In the embodiment, as an example, a rectangular, relatively thin, and transparent input operation panel 5 (a touch panel, a touch sensor, an operation surface, an input operation module, an input receiver) is provided on the front side (frontal side, on the side of the wall 2k) of the display device 4. The input operation panel 5 covers the display screen 4a. An operator (e.g., a user) can perform an input operation by touching, pressing, rubbing the input operation panel 5 with a hand, a finger, or a stylus, or moving a hand, a finger, or a stylus near the input operation panel 5. Light emitted from the display screen 4a of the display device 4 passes through the input operation panel 5, and travels to the front side (outside) of the housing 2 through the opening 2r on the wall 2k. The input operation panel 5 is an example of an input module. In the embodiment, as an example, the display device 4 and the input operation panel 5 are fixed to (supported by) the housing 2 with fixtures (e.g., fixing components or braces such as screws, braces, or components not illustrated) or an adhesive portion (e.g., an adhesive or double-sided tape not illustrated). The input operation panel 5 may be an in-cell touch panel comprised in the display device 4.

In the embodiment, as an example, as illustrated in FIG. 1, the housing 3 has an appearance of a rectangle in the front view and the rear view (in the embodiment, an oblong that is long in lateral directions, as an example). As illustrated in FIG. 1, the housing 3 has a rectangular parallelepiped shape that is thin and flat in the front-back direction (in the thickness direction of the housing 3, the left and right direction in FIG. 1). The housing 3 has the surface 3a (the outer surface, the front surface, the frontal surface, the frontal surface, the surface portion), a surface 3b (an inner surface, a rear surface, a back surface, a behind surface, a surface portion) opposite the surface 3a, and a surface 3p extending between the surface 3a and the surface 3b (the side surface, the surface portion). The surface 3a and the surface 3b both intersect with the thickness direction. The surface 3a and the surface 3b extend approximately in parallel. The surfaces 3a, 3b intersect (in the embodiment, perpendicularly, as an example) with the surface 3p. The housing 3 also has four ends 3c to 3f (side portions, edge portions, peripheral portions) and four corners 3g to 3j (pointed portions, curved portions, ends) in the front view. The ends 3c, 3e are examples of a longer side. The ends 3d and 3f are examples of a shorter side.

The housing 3 has a wall 3k (a part, a plate, a front wall, a frontal wall, a top wall, a first wall), a wall 3m (a part, a plate, a rear wall, a back wall, a bottom wall, a second wall), and a wall 3n (a part, a plate, a side wall, an end wall, a standing wall, a stretching portion, a third wall). The wall 3k comprises the surface 3a. The wall 3m comprises the surface 3b. The wall 3n comprises the surface 3p. The walls 3k, 3m, and 3n all have a rectangular shape (in the embodiment, an oblong shape, as an example). The walls 3k, 3m, and 3n all have a plate-like shape. The rectangular opening 3r is provided to the wall 3k.

The housing 3 is configured as a combination of a plurality of components (divided portions, members). The housing 3 comprises a member 31 (a front side member, a cover, bezel, a plate, a first member) and a member 32 (a rear side member, a base, a bottom, a plate, a second member), as an example. The member 31 comprises the wall 3k. The member 32 comprises the wall 3m. The wall 3n is comprised in at least one of the member 31 and the member 32 (in the embodiment, in the member 32, as an example). The members 31, 32 may be made of a material such as a metal or a synthetic resin. When a metallic material is used, these members maybe produced by casting, pressing, or machining, for example. When a synthetic resin material is used, these members may be produced by injection molding, for example. The housing 3 may comprise another member (not illustrated) in addition to the members 31, 32.

In the embodiment, as an example, one or more board (s) 10 (board assembly(ies) 11, component(s)) are housed in the housing 3. The board 10 is arranged in parallel with the keyboard 6. The board 10 is fixed to the housing 3 with couplers (not illustrated).

In the embodiment, as an example, a plurality of components (not illustrated) such as a central processing unit (CPU), a graphic controller, power circuit components, a platform controller hub (PCH), a memory slot connector, an LCD connector, an input/output (I/O) connector, a power coil, an element, and a connector may be implemented on the board 10. The control circuit may comprise a video signal processing circuit, a tuner, a high-definition multimedia interface (HDMI) signal processor, an audio video (AV) input terminal, a remote controller signal receiver, a controller, a selector, an on-screen display, a storage (e.g., a read-only memory (ROM), a random access memory (RAM), a hard disk drive (HDD), or a solid state drive (SSD)), an audio signal processing circuit, and the like. The control circuit controls video outputs (e.g., moving images or still images) from the display screen 4a of the display device 4, audio outputs from a speaker (not illustrated), and light outputs from a light emitting diode (LED) (not illustrated) . The display device 4, the speaker, the LED, and the like are examples of an output module.

Figure 2:
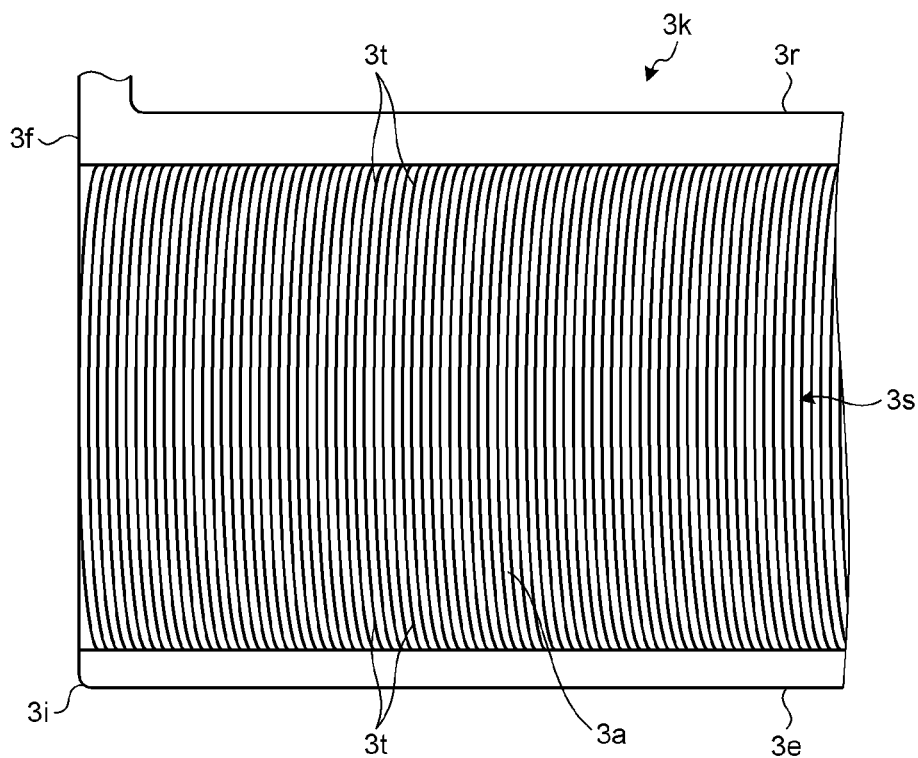
FIG. 2 is an exemplary plan view of a wall of a housing of one example of the electronic device as viewed from outside of the housing, in the embodiment.

In the embodiment, as an example, as illustrated in FIG. 2, linear depressed and protruded shapes 3t (recesses, recessed grooves, protruding portions, protruding lines that are not illustrated in FIG. 1) that are relatively thin and small are provided on the surface 3a (the outer surface, the front surface, the external surface of the housing 3) of a palm rest 3s on the wall 3k. The depressed and protruded shapes 3t are curved (in an arc shape), when viewed from a direction normal to the surface 3a (a direction perpendicular to the surface 3a, in thickness direction of the housing 3) (in the plan view). These depressed and protruded shapes 3t prevent hands or fingers from slipping on the palm rest 3s, allow fingerprints to be less visible, and reduce light reflections on the palm rest 3s.

In the embodiment, as an example, the depressed and protruded shapes 3t are formed after the wall 3k is die-cast or manufactured through other production process, because there are some advantages in forming the depressed and protruded shapes 3t after the wall 3k is manufactured. For example, when different specifications (e.g., form, size, direction, height, or depth) of the depressed and protruded shapes 3t are to be used in different models, grades, and units of the electronic devices 1, or when the electronic devices 1 with and without the depressed and protruded shapes 3t are to be manufactured, the manufacturing cost can be easily reduced, as an example.

Figure 3:
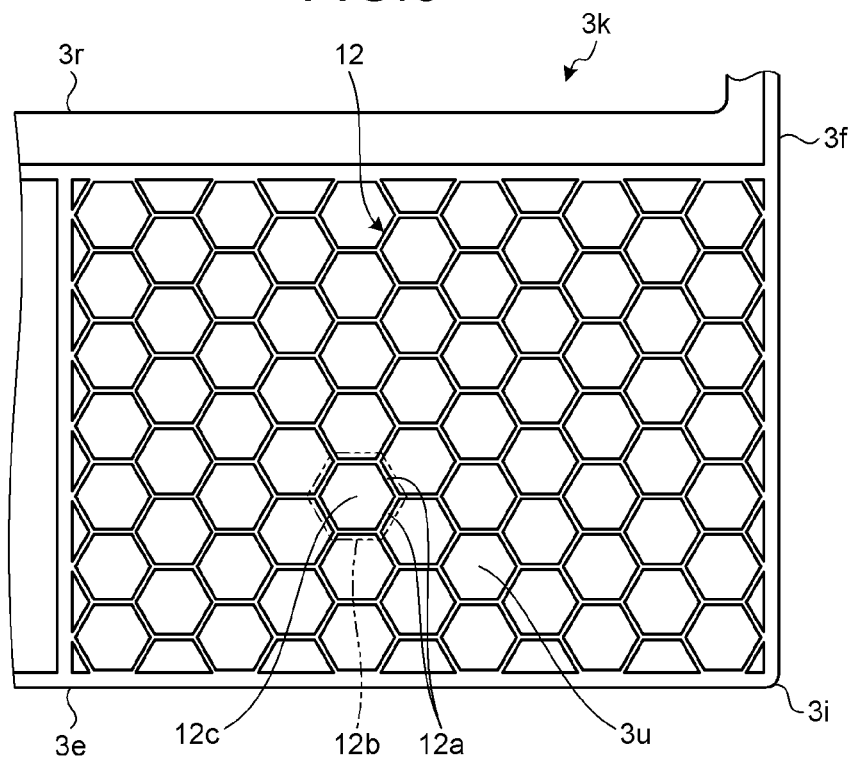
FIG. 3 is an exemplary plan view of the wall of the housing of one example of the electronic device as viewed from inside the housing, in the embodiment.

In the embodiment, as an example, as illustrated in FIG. 3, a honeycomb rib 12 (walls) is provided to a surface 3u (an inner surface, a rear surface, the inner surface of the housing 3) opposite the surface 3a of the palm rest 3s of the wall 3k. The honeycomb rib 12 is manufactured in a manner in which a plurality of walls 12a that is linear in the plan view and protruding from the surface 3u are connected in the manner forming hexagons (regular hexagons) across the entire surface 3u. In other words, the rib 12 comprises a plurality of hexagonal ring-like parts 12b in which six walls 12a of the hexagon are connected in a ring-like manner. The rib 12 forms a plurality of recessed portions 12c each surrounded by the six walls 12a and hexagonal in the plan view. Such a honeycomb rib 12 can increase the stiffness and the strength of the wall 3k while keeping the weight relatively light. The height of the honeycomb rib 12 is constant across the entire area over which the rib 12 is formed (the palm rest 3s), for example. However, alternatively, the height of the rib 12 may be reduced from the part near the center toward the edges of the area.

Figure 4:
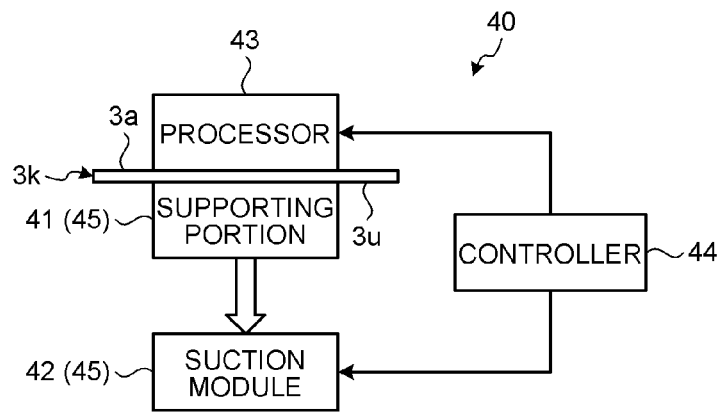
FIG. 4 is an exemplary block diagram of one example of a general configuration of a processing apparatus comprising a supporting apparatus, in the embodiment.

In the embodiment, as an example, the honeycomb rib 12 provided to the surface 3u of the wall 3k is used to support the wall 3k during the time in which the depressed and protruded shapes 3t are formed to the surface 3a of the wall 3k. FIG. 4 illustrates an exemplary configuration of a processing apparatus 40 for processing the wall 3k. The processing apparatus 40 comprises a supporting portion 41 (a supporting fixture, a jig, a supporting station), a suction module 42, a processor 43, and a controller 44. The suction module 42 comprises an air pump (a vacuum pump), an air pipe (none of which are illustrated), and the like. The processor 43 comprises a tool 43a (e.g., a cutter, see FIG. 7, for example) , and a driving module for moving the tool 43a (e.g., a rotational driving module not illustrated). The controller 44 controls the operation of the suction module 42 and the operation of the processor 43, for example. The wall 3k is supported by a supporting apparatus 45 comprising the supporting portion 41 and the suction module 42.

Figure 5:
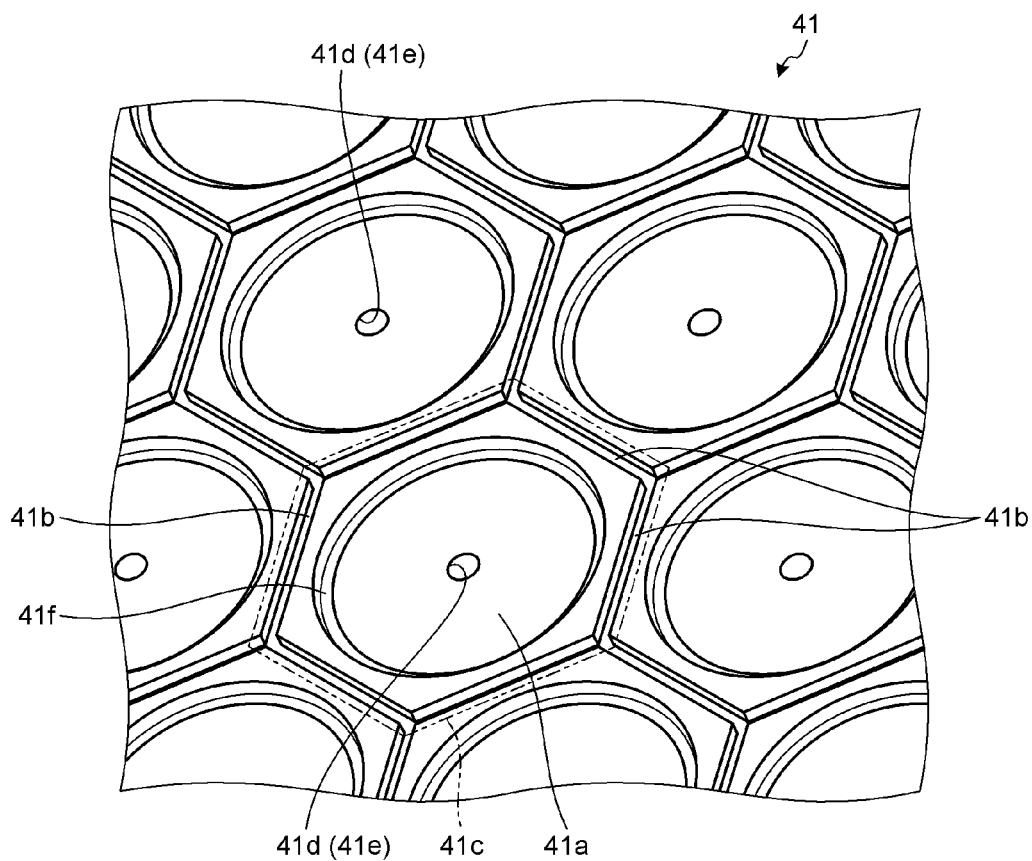
FIG. 5 is an exemplary perspective view of a surface (second surface) of a supporting portion of one example of the supporting apparatus in the embodiment.
Figure 6:
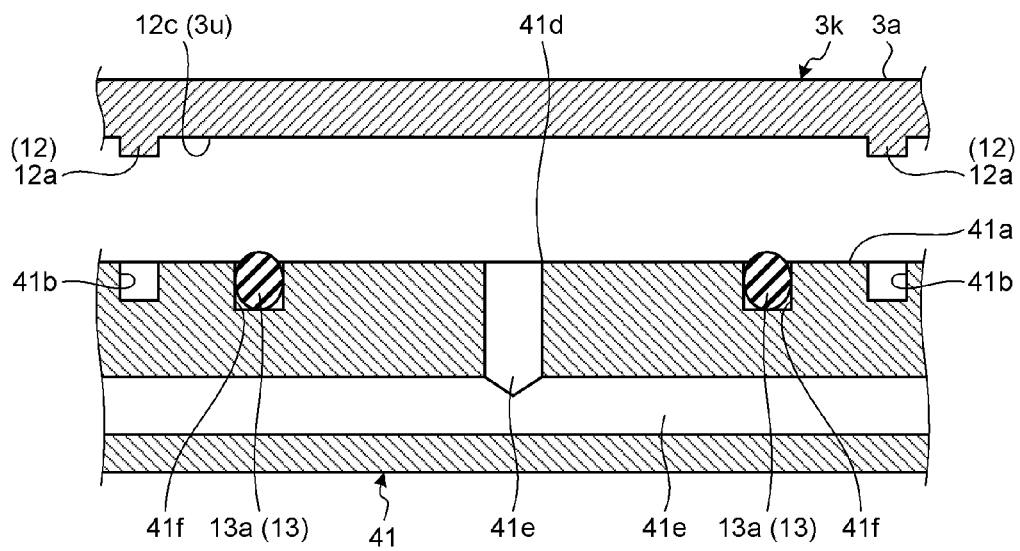
FIG. 6 is an exemplary schematic exploded cross-sectional view of one example of the supporting apparatus and the wall of the housing of one example of the electronic device in the embodiment.
Figure 7:
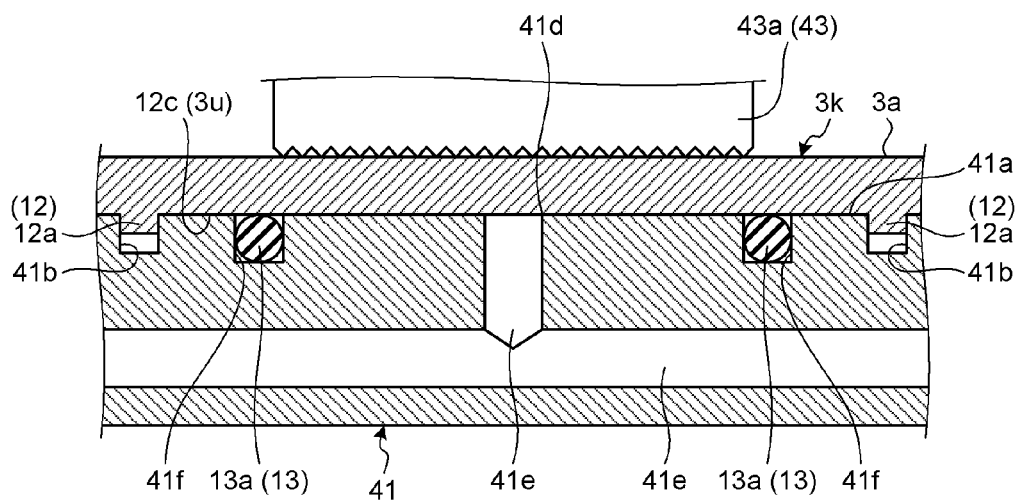
FIG. 7 is an exemplary schematic cross-sectional view of one example of how the wall of the housing of one example of the electronic device is processed while the wall is supported by one example of the supporting apparatus in the embodiment.

In the embodiment, as an example, the supporting portion 41 suctions the wall 3k with the negative air pressure produced by suctioning of the suction module 42. As illustrated in FIGS. 5 to 7, the supporting portion 41 has a surface 41a (a second surface) facing or in contact with the surface 3u of the wall 3k (the first surface).The surface 41a has a honeycomb groove 41b for receiving the honeycomb rib 12. The groove 41b comprises a plurality of hexagonal ring-like parts 41c that are provided correspondingly to the hexagonal ring-like parts 12b of the honeycomb rib 12. The groove 41b may have a width, a depth, and the like larger than those of the rib 12 so that the rib 12 can be received in the groove 41b. The opening of the groove 41b (the periphery or the edge of the opening) may be chamfered, as appropriate.

In the embodiment, as an example, an inlet 41d is provided to the surface 41a at a side inside the ring (an inner side) of each of the ring-like parts 41c. The inlet 41d is provided at an approximate center of the area inside of the ring-like part 41c. The inlet 41d is a part where an inlet passage 41e provided to the supporting portion 41 is opened on the surface 41a. In the embodiment, as an example, the inlet 41d is provided in plurality, and each of the inlets 41d is opened in each of all of the ring-like parts 41c.

In the embodiment, as an example, a sealing portion 13 is provided in each of the ring-like parts 41c. In the embodiment, as an example, the sealing portion 13 comprises a circular groove 41f (a second groove) positioned between the ring-like part 41c and the inlet 41d on the surface 41a, in the manner surrounding the inlet 41d. An O ring 13a (a sealing member) is inserted in the groove 41f. In the embodiment, as an example, as illustrated in FIG. 7, the sealing portion 13 is implemented as an O ring 13a that is elastically compressed between the surface 41a and the surface 3u.

In other words, in the embodiment, as an example, the wall 3k is placed on the surface 41a of the supporting portion 41, as illustrated in FIGS. 6 and 7. At this time, the honeycomb rib 12 provided on the surface 3u is housed (received) in the honeycomb groove 41b provided on the surface 41a. When the air is taken in through the inlets 41d, by the action of the suction module 42 (see FIG. 4), negative air pressure is produced between the surface 41a and the surface 3u on the side of the inlet 41d of the sealing portion 13. This negative air pressure enables the wall 3k to be suctioned to and to be supported by the supporting portion 41. At this time, the surface 41a and the surface 3u are brought into contact, for example. As illustrated in FIG. 7, the tool 43a is then moved while the wall 3k is supported by the supporting portion 41, and the depressed and protruded shapes 3t are processed on the surface 3a of the wall 3k. Examples of a process performed by the tool 43a include cutting, grinding, and pressing.

As explained above, in the embodiment, as an example, the surface 41a of the supporting portion 41 has the groove 41b for receiving the rib 12 while the wall 3k is supported by the supporting portion 41. The surface 41a is provided with the inlets 41d opening toward the surface 3u and positioned in the respective hexagonal ring-like parts 41c of the groove 41b. The air is then taken in through the inlet 41d by the suction module 42. According to the embodiment, as an example, because the wall 3k is suctioned, the supporting portion 41 can support the wall 3k more reliably. According to the embodiment, as an example, the rib 12 having the hexagonal ring-like parts 12b is received in the groove 41b having the hexagonal ring-like parts 41c. The rib 12 and the supporting portion 41 are engaged with each other while the rib 12 is received in the groove 41b, as an example, which makes it difficult for the wall 3k to be displaced from the supporting portion 41 under a force in the direction along the surfaces 3a, 3u, 41a applied by the processor 43. Furthermore, according to the embodiment, as an example, the negative air pressure produced by suctioning the air between the surface 3u and the surface 41a through the inlet 41d acts on the area surrounded by the rib 12 received in the groove 41b. At this time, the rib 12 received in the groove 41b acts as a flow resistance of the air, which reduces the loss of the force supporting (maintaining, suctioning) the wall 3k and produced by suctioning of the air through the inlet 41d because of air leakage.

Furthermore, in the embodiment, as an example, the sealing portion 13 (the O ring 13a, the sealing member) interposed between the surface 3u and the surface 41a is provided between the ring-like part 41c and the inlet 41d. Therefore, according to the embodiment, as an example, the sealing portion 13 further reduces air leakage. This reduces the loss of the force supporting (maintaining, suctioning) the wall 3k and produced by taking in the air through the inlet 41d.

Furthermore, in the embodiment, as an example, the sealing portion 13 comprises the O ring 13a (the sealing member) with a ring-like shape, and at least one of the surface 3u and the surface 41a (in the embodiment, the surface 41a, as an example) has the groove 41f for receiving the O ring 13a. Therefore, according to the embodiment, as an example, the O ring 13a can be supported more reliably. This reduces the loss of the sealing function of the O ring 13a, as an example.

Figure 8:
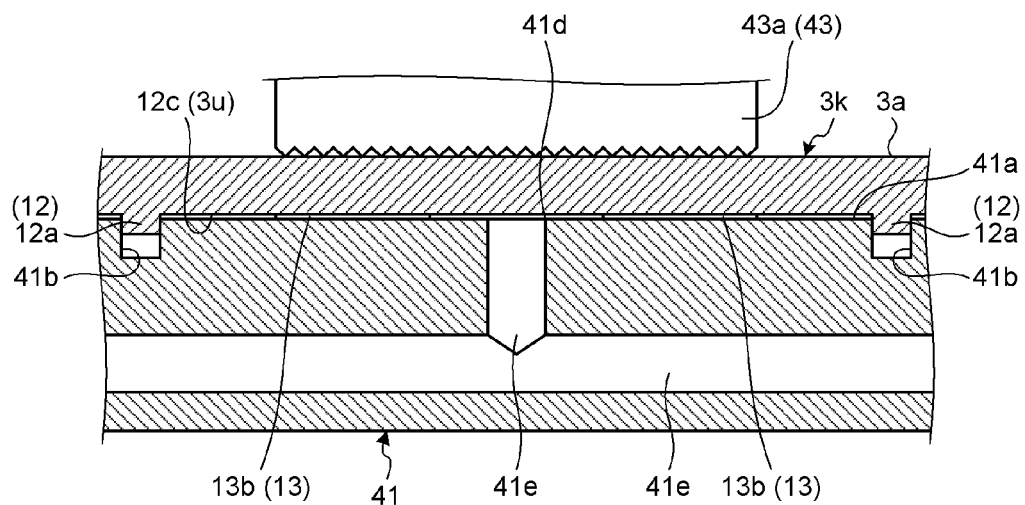
FIG. 8 is an exemplary schematic cross-sectional view of one example of a state in which a wall of a housing of one example of an electronic device is processed while the wall is supported by one example of a supporting apparatus, according to a first modification.

According to a first modification illustrated in FIG. 8, a ring-like and sheet-like packing 13b surrounding the inlet 41d is provided as the sealing portion 13. The packing 13b is provided on the surface 41a of the supporting portion 41 between the inlet 41d and the ring-like part 41c (the groove 41b, see FIG. 5), and is interposed between the surface 3u and the surface 41a. According to the first modification, the same results (advantageous effects) as those achieved in the embodiment providing the sealing portion 13 can be achieved, as an example. The packing 13b may be fixed to the supporting portion 41 by means of adhesion or welding, for example.

Figure 9:
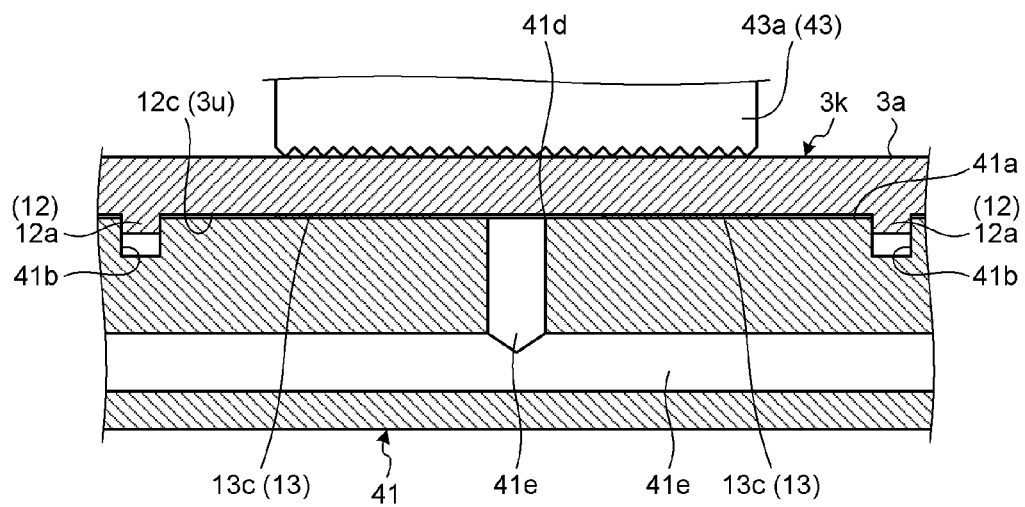
FIG. 9 is an exemplary schematic cross-sectional view of one example of a state in which a wall of a housing of one example of an electronic device is processed while the wall is supported by one example of a supporting apparatus, according to a second modification.

According to a second modification illustrated in FIG. 9, grease 13c (sealing agent) is applied between the surface 41a and the surface 3u as the sealing portion 13. The grease 13c is applied to at least one of the surface 41a and the surface 3u (in the embodiment, the surface 41a, as an example). The grease 13c is also applied on the surface 41a of the supporting portion 41 and applied to at least between the inlet 41d and the ring-like part 41c (the groove 41b, see FIG. 5), and is interposed between the surface 3u and the surface 41a. According to the second modification, the same results (advantageous effects) as those achieved in the embodiment and the first modification providing the sealing portion 13 can be achieved, as an example.

Figure 10:
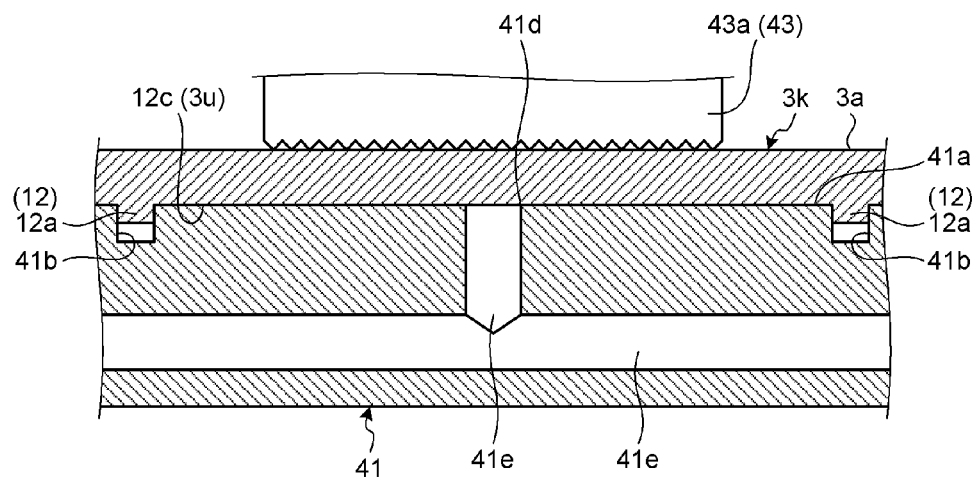
FIG. 10 is an exemplary schematic cross-sectional view of one example of a state in which a wall of a housing of one example of an electronic device is processed while the wall is supported by one example of a supporting apparatus, according to a third modification.

According to a third modification illustrated in FIG. 10, the sealing portions 13 used in the embodiment or the modifications are not provided. Even when the sealing portions 13 are not provided, there are cases in which the required supporting force (suctioning force) is achieved by suctioning the air with the suction module 42 through the inlets 41d (see FIG. 4). In such a configuration, for example, the coarseness and the smoothness of the surfaces 3u, 41a, the size of the space between the rib 12 and the groove 41b, and the flow rate of the suction module 42 may be adjusted as appropriate.

Figure 11:
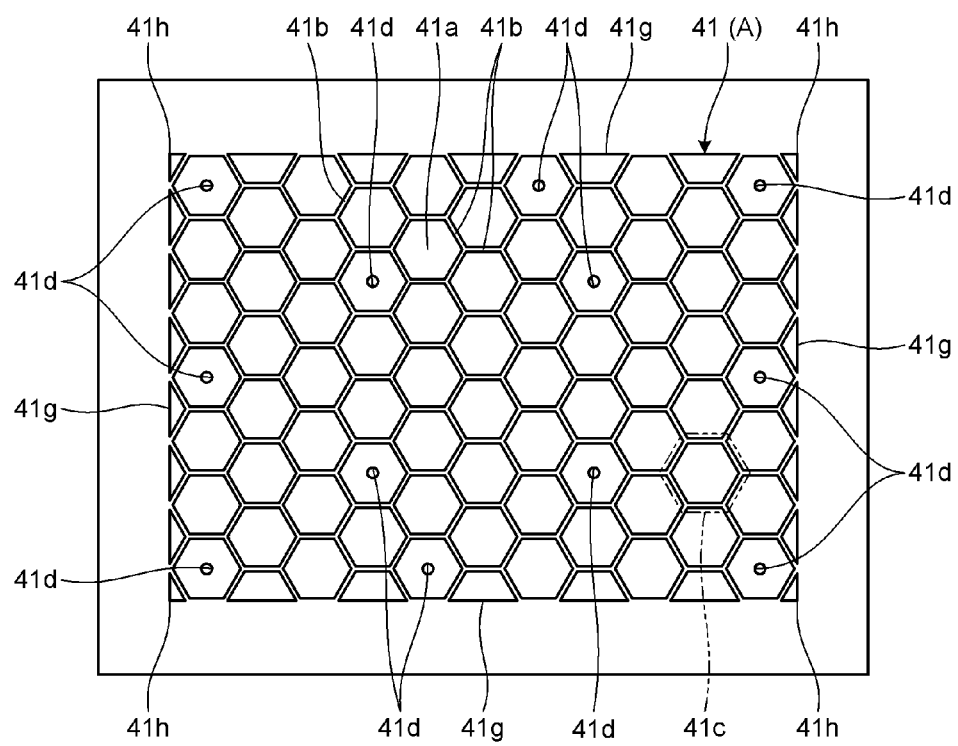
FIG. 11 is an exemplary schematic plan view of a surface (second surface) of a supporting portion of one example of a supporting apparatus, according to a fourth modification.

According to a fourth modification illustrated in FIG. 11, the inlets 41d are provided only to some of the ring-like parts 41c, instead of being provided to all of the ring-like parts 41c. In the fourth modification, as an example, the inlets 41d are provided along ends 41g and corners 41h of the entire area A in which the groove 41b is formed. According to the fourth modification, as an example, because of fewer inlets 41d, the supporting portion 41 can be manufactured less expensively. When the wall 3k is separated from the supporting portion 41 at the ends 41g or the corners (ends) 41h of the area A, the size of the area in which the pressure increases and the supporting force (suctioning force) is reduced tends to become larger. Therefore, according to the fourth modification, as an example, because the inlets 41d are provided along the ends 41g and at the corners 41h, the wall 3k and the supporting portion 41 are less separated by an external force.

Figure 12:
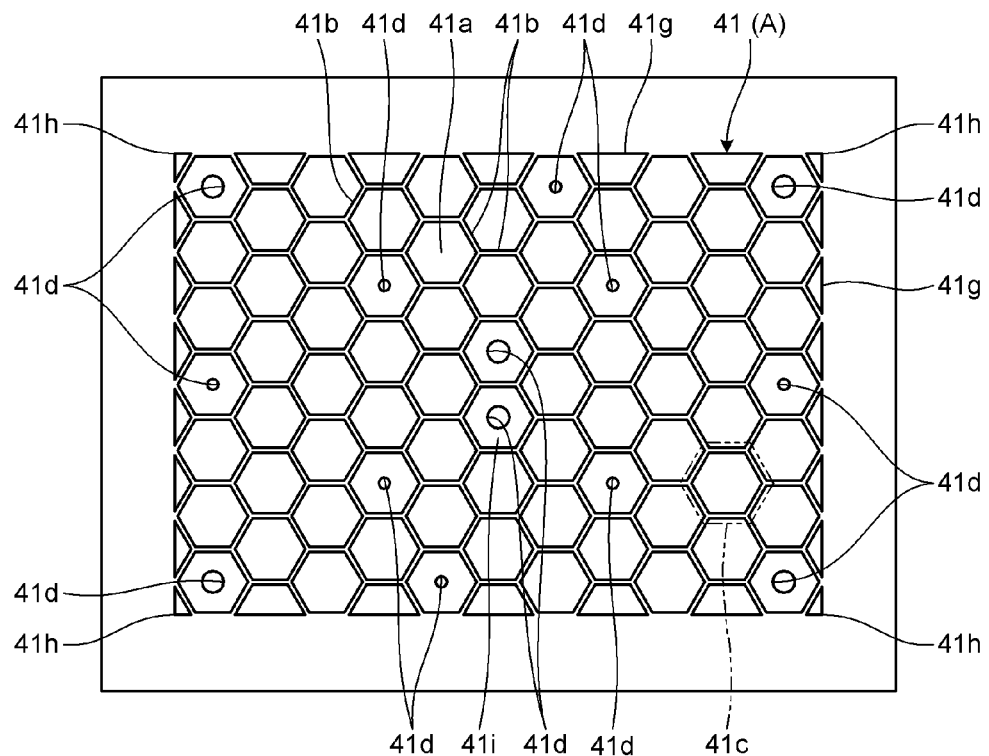
FIG. 12 is an exemplary schematic plan view of a surface (second surface) of a supporting portion of one example of a supporting apparatus, according to a fifth modification.

According to a fifth modification illustrated in FIG. 12, an area of an opening of each of the inlets 41d provided in the corresponding ring-like part 41c differs depending on where the inlet 41d is positioned on the surface 41a. In the fifth modification, as an example, the area of the opening of the inlet 41d provide at the corner 41h or a center 41i of the area A is larger than the area of the opening of the other inlets 41d. When the size of the opening of the inlet 41d is increased, the supporting force (suctioning force) is increased. Therefore, according to the fifth modification, as an example, there are cases in which the supporting portion 41 can support the wall 3k more efficiently by changing the supporting force (suctioning force) using an area of the opening of the inlet 41d which differs depending on where the inlet 41d is positioned on the surface 41a.

Figure 13:
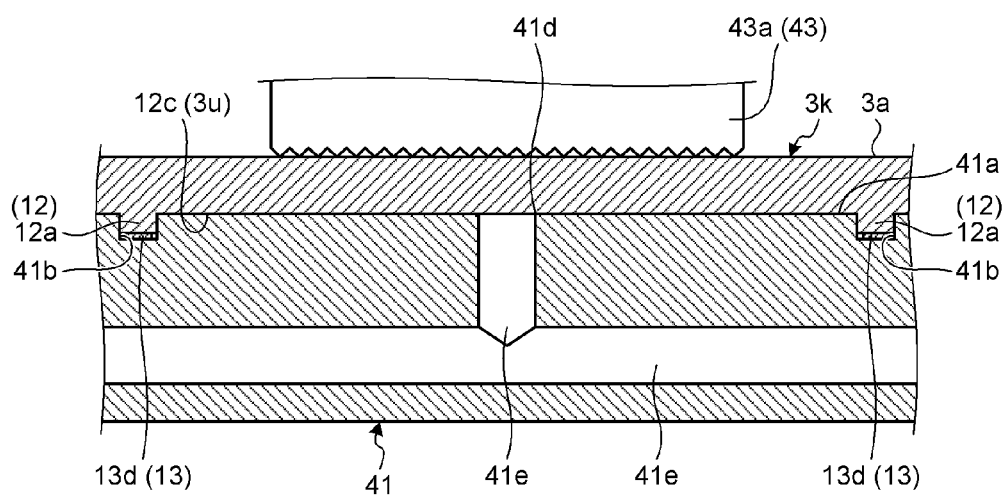
FIG. 13 is an exemplary schematic cross-sectional view of one example of a state in which a wall of a housing of one example of an electronic device is processed while the wall is supported by one example of a supporting apparatus, according to a sixth modification.

According to a sixth modification illustrated in FIG. 13, a gasket 13d received in the groove 41b is provided as the sealing portion 13. The gasket 13d has a honeycomb meshed structure, and is positioned on the bottom of the groove 41b, and interposed between the bottom of the groove 41b and the tip of the rib 12. According to the sixth modification, the same results (advantageous effects) as those achieved in the embodiment and the modifications providing the sealing portion 13 can be achieved, as an example. Furthermore, according to the sixth modification, as an example, because the gasket 13d is integrally connected, the gasket 13d can be handled more easily.

Figure 14:
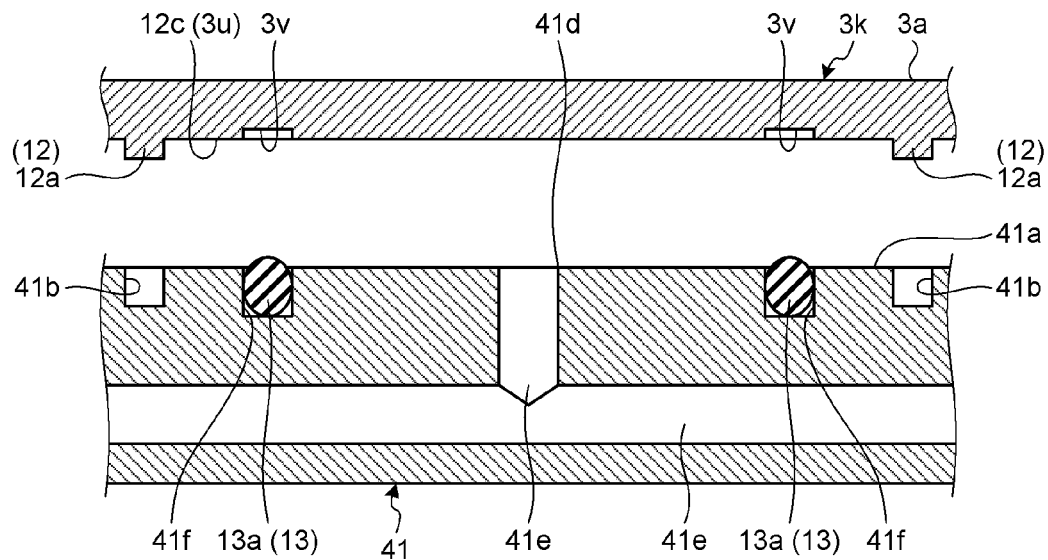
FIG. 14 is an exemplary schematic exploded cross-sectional view of one example of a supporting apparatus and a wall of a housing of one example of an electronic device, according to a seventh modification.
Figure 15:
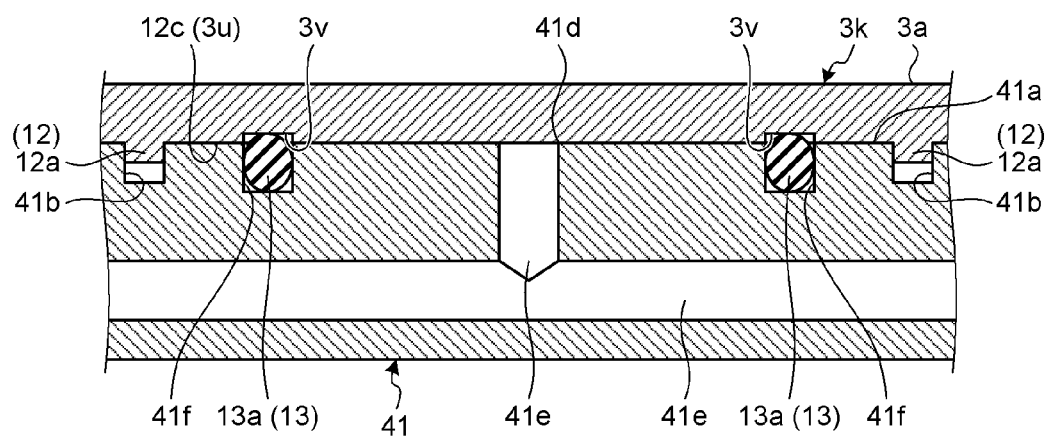
FIG. 15 is an exemplary schematic cross-sectional view of one example of the supporting apparatus and the wall of the housing of one example of the electronic device, in the seventh modification.

According to a seventh modification illustrated in FIGS. 14 and 15, the O ring 13a is provided as the sealing portion 13, in the same manner as in the embodiment. In the seventh modification, however, the surface 3u of the wall 3k of the housing 3, as well as the supporting portion 41, has a groove 3v (a second groove) for receiving the O ring 13a. According to the seventh modification, the same results (advantageous effects) as those achieved in the embodiment and the modifications providing the sealing portion 13 can be achieved, as an example. Furthermore, in the seventh modification, the grooves 3v provided in the respective ring-like parts 12b on the surface 3u of the wall 3k of the housing 3 can prove that the supporting apparatus 45 (the supporting portion 41) according to the seventh modification actually supports the wall 3k of the housing 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. The present invention is not limited to the embodiment, and various modifications are still possible. Furthermore, the specifications of each element (e.g., structure, type, direction, shape, size, length, width, thickness, height, number, arrangement, positions, and materials) can be changed as appropriate. For example, the honeycomb rib may be provided to another wall. Furthermore, the process achieved by the processor may be printing, without limitation to cutting, grinding, or pressing. Furthermore, the area of the opening of the inlet may be adjusted depending on the number of the inlets. Furthermore, the sealing agent may be oil, for example, without limitation to the grease.

Moreover, the various modules of the systems described herein can be implemented as software applications, hardware and/or software modules, or components on one or more computers, such as servers. While the various modules are illustrated separately, they may share some or all of the same underlying logic or code.

What is claimed is:

1. A supporting apparatus comprising:
   a supporting portion configured to support a wall of an electronic device, wherein the electronic device comprises a first surface with a honeycomb rib protrusion, and wherein the supporting portion comprises a second surface comprising a first groove and an inlet, the first groove being configured to receive the rib in a state in which the supporting portion supports the wall, the inlet being configured to open toward a first face at a position within a hexagonal ring-like part of the first groove; and
   a suction module configured to take in air through the inlet.

2. The supporting apparatus of claim 1, wherein
   the ring-like part comprises a plurality of ring-like parts,
   the inlet is configured to be provided to at least a portion of the ring-like parts.

3. The supporting apparatus of claim 2, wherein the inlets are positioned along an end of the second surface.

4. The supporting apparatus of claim 1, wherein an area of an opening of the inlet inside the ring-like part differs depending on a position of the inlet on the second surface.

5. The supporting apparatus of claim 1, further comprising a sealing portion interposed between the first surface and the second surface and between the ring-like part and the inlet.

6. The supporting apparatus of claim 5, wherein
   the sealing portion comprises a ring-like sealing member, and
   a second groove configured to receive the sealing member is provided to at least one of the first surface and the second surface.

7. The supporting apparatus of claim 5, wherein the sealing portion comprises a sealing agent applied to at least one of the first surface and the second surface.

8. A supporting portion comprising:
   a second surface; and
   an inlet passage, wherein
   the second surface is configured to support a wall, the wall comprising a first surface with a honeycomb rib protrusion,
   the second surface comprising a groove and an inlet,
   wherein the groove is configured to receive the rib in a state in which the supporting portion supports the wall,
   the inlet is configured to be opened toward the first surface at a position within a hexagonal ring-like part of the groove, and
   the inlet passage is configured to be connected to the inlet.

* * * * *